United States Patent [19]

Givens

[11] 4,282,440
[45] Aug. 4, 1981

[54] NEUTRON ACCELERATOR TUBE HAVING IMPROVED IONIZATION SECTION

[75] Inventor: Wyatt W. Givens, Dallas, Tex.

[73] Assignee: Mobil Oil Corporation, New York, N.Y.

[21] Appl. No.: 145,935

[22] Filed: May 2, 1980

[51] Int. Cl.³ ............................................. C21G 4/02
[52] U.S. Cl. ................................. 250/499; 313/615; 313/54
[58] Field of Search ............... 250/499, 500, 501, 502, 250/423 R, 423 F, 427, 399, 493; 313/61 S, 61 R, 54, 357, 359

[56] References Cited

U.S. PATENT DOCUMENTS

| | | |
|---|---|---|
| 2,990,492 | 6/1961 | Wellinger et al. ...................... 313/54 |
| 3,246,191 | 4/1966 | Frentrop .............................. 250/501 |
| 3,393,316 | 7/1968 | Carr .................................. 250/499 |
| 4,123,682 | 10/1978 | Lange et al. ......................... 313/54 |

*Primary Examiner*—Bruce C. Anderson
*Attorney, Agent, or Firm*—C. A. Huggett; M. G. Gilman; G. W. Hager

[57] ABSTRACT

A neutron accelerator tube having a target section, an ionization section, and a replenisher section for supplying accelerator gas to the ionization section. The ionization section is located between the target and the replenisher section and includes an ionization chamber adapted to receive accelerator gas from the replenisher section. The ionization section further includes spaced cathodes having opposed active surfaces exposed to the interior of the ionization chamber. The active surface of at least one of the cathodes is formulated of a $\beta^-$ emitting material. An anode is located intermediate the cathodes whereby in response to an applied positive voltage, electrons are transmitted between the opposed active surfaces of the cathodes and produce the emission of secondary electrons. The active surface of the other cathode may be formulated of a $\beta^-$ ray emitter or of material having a secondary electron emission factor of at least 2. One cathode member located in the tube adjacent to the replenisher section may have a protuberant portion extending axially into the ionization chamber and formulated of a $\beta^-$ ray emitting material. A portion of the active surface of the cathode which is recessed with respect to the protuberant portion may be formulated of a material having a secondary electron emission factor of at least 2. The other cathode spaced from the first cathode member in the direction of the target has an aperture therein along the axis of the protuberant portion.

9 Claims, 3 Drawing Figures

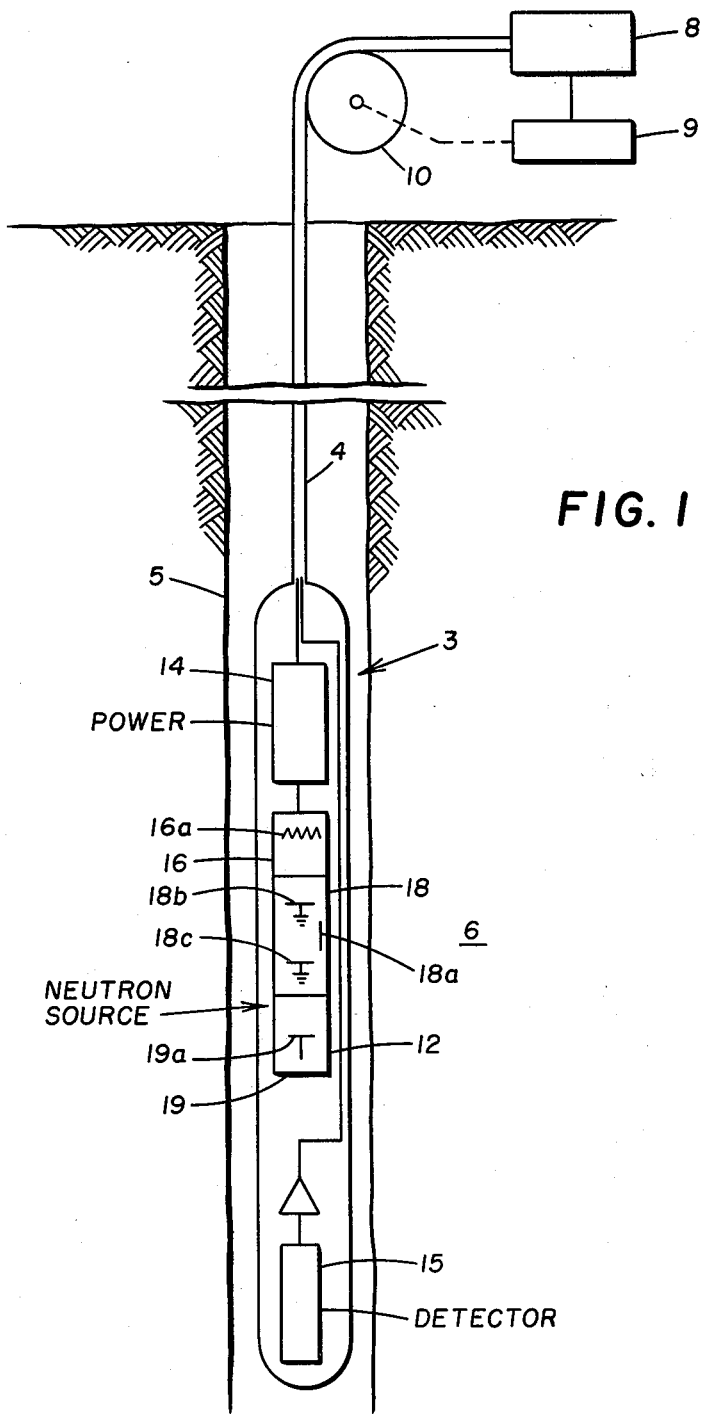

NEUTRON ACCELERATOR TUBE HAVING IMPROVED IONIZATION SECTION

BACKGROUND OF THE INVENTION

This invention relates to neutron sources and more particularly to accelerator-type neutron tube sources having improved ionization sections.

Accelerator-type neutron tube sources are employed in many applications. A well known application is in the radioactivity logging of wells penetrating subterranean formations. For example, in the art of neutron-neutron well logging a source of primary neutrons is employed to irradiate subterranean formations of interest. The resulting secondary radiation is measured by one or more detectors spaced axially from the source within the borehole. Such secondary irradiation may take the form of thermal neutrons, epithermal neutrons, or thermal neutron capture gamma rays. A logging tool of this type employed for porosity measurements is disclosed in U.S. Pat. No. 4,005,290 to Allen wherein the logging tool includes a neutron source and epithermal and thermal neutron detectors.

In procedures such as porosity logging, the neutron source is a continuous source usually of a chemical type. Other well known radioactive well logging techniques involve the use of pulsed neutron sources. For example, in the art of radioactive assay well logging an assay tool is lowered into the well to the level of a formation to be assayed. The assay operation is then carried out by cyclically operating a neutron source in the tool in order to irradiate the formation under investigation with repetitive bursts of fast neutrons. In one assay procedure, disclosed in U.S. Pat. No. 3,686,503 to Givens et al, delayed fission neutrons emitted by uranium within the formation may be detected by a neutron detector. Another procedure, disclosed in U.S. Pat. No. 4,180,730 to Givens et al., involves detection of prompt fission neutrons emitted from uranium in the formation. Pulsed neutron logging techniques may also be employed in procedures in which radioactive decay rates are determined. Thus, the formation under investigation is irradiated with a burst of fast neutrons and the resulting neutron population is detected during successive or overlapping time windows. For example, U.S. Pat. No. 3,800,150 to Givens discloses a pulsed neutron logging technique in which epithermal neutron decay or thermal neutron decay is measured by employing time windows for detection which partially overlap one another.

Neutron sources such as may be employed in radioactive logging procedures as described above may take the form of accelerator-type neutron tubes comprising a target section, a replenisher section, and an ionization section located between the target and the replenisher section. The replenisher section provides a source of accelerator gas to the ionization section where it is ionized and then accelerated to impact the target. The target is formulated of material which responds to the bombarding ions to produce neutrons. In a number of well known accelerator-type tube sources, heavy isotopes of hydrogen are employed as the accelerator gas and in the target. For example, the accelerator gas may take the form of deuterium or mixtures of deuterium and tritium and the target may include tritium molecules, deuterium molecules or mixtures of deuterium and tritium molecules. The so-called deuterium-tritium nuclear reaction is one commonly employed in an accelerator-type neutron tube to produce neutrons. In the replenisher section a filament or reservoir usually made of zirconium or titanium is electrically heated (under controlled conditions) to release deuterium gas previously adsorbed in the filament or reservoir. Zirconium and titanium have the property of adsorbing copious quantities of different gases such as hydrogen, deuterium, tritium, and other gases. These materials have the further property of releasing the hydrogen isotope gases under a controlled release condition when heated to about 300° C. and at the same time retaining other gases that may have been adsorbed. The deuterium molecules are ionized in the ionizing section by the application of a positive voltage to an anode in the ionizing section. The deuterium ions are then accelerated by a large negative voltage, e.g. $-100$ KV, and impact the tritium target to produce a supply of neutrons.

While various techniques may be employed in ionizing the accelerator gas, one ionization technique which is suitable particularly where the neutron source is operated at a low accelerator gas pressure and in a pulsed mode is the so-called Penning method. A Penning ion source comprises spaced cathodes and an anode located intermediate the cathodes. In a cold-cathode type Penning ion source, electrons are emitted from a cathode surface by field emission when a positive voltage pulse is applied to the anode. A magnet associated with the source functions to spiral the electrons thus increasing their flight path and increasing the statistical probability that they will collide with molecules of accelerator gas supplied to the ionization chamber. In a well designed Penning ion source, some of the electrons originating at one cathode surface will impact the other cathode surface and secondary electrons are emitted which also function to increase the ionization reaction. Such ion sources are well known to those skilled in the art and are described in Flinta, J. "Pulsed High-Intensity Ion Source," Part I; Pauli, R. and Flinta, J. "Pulsed High-Intensity Ion Source," Part II, Nuclear Instruments 2, pp 219–236 (1958). In a hot-cathode type Penning ion source, one cathode is a heated filament and initial electrons are supplied by thermionic emission from the filament. In all other respects, cold-cathode and hot-cathode Penning ion sources are essentially the same. Hot-cathode ion sources are also well known to those skilled in the art and one such source is described in Wood, J. and Crocker, A. "An Electrostatically Focused Ion Source and Its Use In A Sealed-Off D.C. Neutron Source," Nuclear Instruments And Methods 21, pp 47–48 (1963).

SUMMARY OF THE INVENTION

In accordance with the present invention, there is provided an accelerator-type neutron tube having a new and improved ionization section for ionizing the accelerator gas. The ionization section is located between the target section and replenisher section of the neutron tube and comprises an ionization chamber adapted to receive accelerator gas from the replenisher section. First and second cathodes are spaced from one another and have opposed active surfaces exposed to the interior of the chamber. The active surface of at least one of the cathodes is formulated of a $\beta-$ ray emitting material. Anode means are located at a position intermediate of the cathodes. Beta rays are continuously emitted and some impact the opposite cathode and other surfaces thus producing secondary electrons. Therefore, there exists in the ionization chamber at all times both β— rays and secondary electrons. In response to a positive voltage applied to the anode, electrons are transmitted between the opposed active surfaces of the cathodes and instantaneously produce both ions and the emission of additional secondary electrons.

In a further embodiment of the invention, the active surface of a first cathode member located adjacent to the replenisher section of the tube has a protuberant portion extending axially into the ionized chamber which is formulated of a β— ray emitting material. A second cathode member spaced from the first cathode member in the direction of the target has an aperture therein along the axis of the protuberant portion. The second cathode member has a surface exposed to the interior of the ionization chamber which is formulated of a material having a secondary electron emission factor of at least 2. An anode member extends peripherally around the interior of the ionization chamber at a position intermediate the first and second cathode members.

BRIEF DESCRIPTION OF THE DRAWINGS

FIG. 1 is a schematic illustration of a well logging system embodying the present invention.

DESCRIPTION OF SPECIFIC EMBODIMENTS

Figure 3:
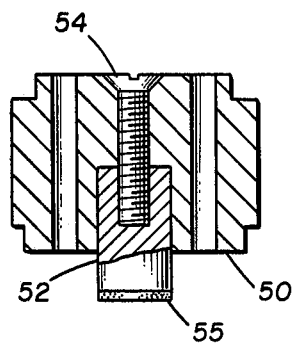
FIG. 3 is a view partly in section of an alternative cathode element suitable for use in this invention.

Turning now to FIG. 1, the invention will be described with respect to a preferred application in a radioactive well logging system, and particularly one in which the neutron source is operated in a pulsed mode. The well logging system comprises a logging tool 3 which is suspended from a cable 4 within a well 5 traversing a subterranean formation of an interest indicated by reference numeral 6. The well bore may be lined or unlined with casing but will normally be filled with a fluid such as drilling mud, oil or water. Signals from the logging tool are transmitted uphole via suitable conductors in the cable 4 to an uphole analysis and control circuit 8. Circuit 8 operates on the downhole measurements and applies one or more output functions to a recorder 9. In addition, circuit 8 transmits certain control functions to the logging tool via conductors in cable 4. As the logging tool is moved through the hole, a depth recording means, such as a measuring sheave 10, produces a depth signal which is applied to recorder 9, thus correlating the downhole measurements with the depths at which they are taken.

The logging tool 3 comprises a pulsed neutron source 12, a downhole power supply 14 for the source, and a radiation detector 15, which responds to primary or secondary radiation in the formation in response to the output of the pulsed neutron source. For example, the detector 15 may be a gamma ray detector, a thermal neutron detector or an epithermal neutron detector. While only one detector is shown, it will be recognized that such logging tools may comprise a plurality of detectors responsive to similar or dissimilar radiation.

The pulsed neutron source is an accelerator-type neutron tube comprising a replenisher section 16, an ionization section 18, and a target section 19. Replenisher section 16 may comprise replenisher element 16a which releases deuterium gas in response to an applied DC or AC voltage from power supply 14. Target section 19 comprises a tritium target 19a. The target section will also typically include an extraction-focusing electrode assembly and a negative high voltage supply (not shown) which functions to direct ions from the ionization section 18 to the target 19a while suppressing the counter current flow of secondary electrons produced by ion impact on the target. The ionization section 18 includes anode means 18a and cathode means 18b and 18c.

The neutron source 12 may be operated in a continuous or in a pulsed mode. In either mode of operation, deuterium gas released upon the application of power to the replenisher element 16 enters the ionization section 18 where the gas molecules are ionized by a positive (with respect to cathodes 18b and 18c) ionization voltage applied across anode 18 and cathodes 18b and 18c. The deuterium ions formed in the ionization section are then accelerated toward the target 19a by a negative voltage pulse applied to the target section. For example, a positive voltage or voltage pulse with aplitude from a few hundred volts to a few kilovolts may be applied to anode member 18a and a —100 kilovolt voltage applied to target section 19.

The Penning ionization section of the accelerator-type neutron tube may be of the "cold cathode" or of the "hot cathode" type. In the cold cathode source, the primary electrons are produced by field emission when a positive voltage pulse is applied to the anode. In the hot cathode type of source, electrons are initially produced by thermionic emission from an electrically heated filament. The cold cathode source suffers the disadvantage, which is of particular significance when the neutron source is operating in a pulsed mode, of having a time lag before the electron flux reaches a sufficient value for optimum ionization of the accelerator gas. Thus, upon applying a positive voltage pulse to the anode there normally is a period from about 3–10 microseconds in which the electron flux builds up to an equilibrium value. The hot cathode source, because electrons are instantly available from thermionic emission, does not suffer this disadvantage. However, the hot cathode source requires an additional high voltage power supply which is particularly significant in the case of downhole logging tools where the power requirements must be met by transmission from the surface.

The concentration of ionized accelerator gas is dependent upon the accelerator gas pressure, i.e., the concentration of gas molecules in the replenisher section and the efficiency of the ionization section. Ionization efficiency is directly related to the flux and energy of free electrons in the ionization section. Therefore, a relatively inefficient ionization process would require a relatively high accelerator gas pressure, i.e., a higher concentration of gas molecules. Conversely, the accelerator gas pressure can be significantly reduced by increasing the electron flux in the ionization section. A very significant increase in neutron production is realized by having an ion source that operates efficiently at low gas pressure in the range of a few microns of Hg pressure. This relationship holds true for continuous ion sources as well as for the pulsed ion sources.

In accordance with the present invention, the efficiency of the ionization section of the neutron source is significantly increased by formulating the active surface of at least one of the cathodes with a radioactive material which functions as a negative beta (β—) ray emitter. Preferably, the radioactive material is a pure β— ray emitter. In a further embodiment of the invention, both cathodes are provided with active surfaces formulated of a β⁻ ray emitting material. Thus, one or more active cathode surfaces may be formulated of radioactive materials such as nickel-63, promethium-147, and carbon-14. Nickel-63 is preferred because it is a pure β⁻ emitter and it has a relatively long half-life of nearly 100 years. Nickel-63 can be readily plated onto a support element that is also a good conductor of magnetic flux such as soft iron, alloys of iron, nickel, etc.

In yet a further embodiment of the invention, the active surface of one of the cathodes is provided with a β⁻ ray emitting material as described above whereas the active surface of the other cathode contains a material having a a secondary electron emission factor of at least 2.

Thus, the active surface of the other cathode may be formulated of alkali metal halides such as potassium, sodium bromine, and lithium and sodium fluorides. Alkaline earth metal halides such as barium and calcium fluorides may also be used. However, the alkali metal and alkaline earth metal halides described above suffer from the practical disadvantage of deteriorating rapidly due to ion bombardment. Other materials which are more useful in formulating the cathode surfaces include metallic oxides such as aluminum oxide, beryllium oxide, barium oxide, and magnesium oxide. Preferably, the cathode surface is formulated of an oxide layer selected from the group consisting of beryllium oxide, aluminum oxide, and magnesium oxide since these materials are relatively stable in a low pressure environment of hydrogen or its heavy isotopes and, if sufficiently thick, are stable to ion impact. Of the oxides mentioned, beryllium oxide is most resistant to reduction in a hydrogen environment, and thus it is especially preferred to employ beryllium oxide in the present invention. Beryllium oxide provides a secondary electron emission factor which is in excess of 3 which is preferred in carrying out this embodiment of the invention. The metallic oxide electrode surfaces may be formulated by heating the metal layer in the presence of air or oxygen to form a relatively thick oxide layer. For example, beryllium may be heated in the presence of oxygen at a temperature of a few hundred °C. to form a uniform beryllium oxide layer of at least two atom layers in thickness. The metal layer with oxidized surfaces is mechanically secured to the cathode.

The use of the high secondary electron emission materials such as the metallic oxides may be contrasted with the use in the prior art of materials such as copper, iron, nickel, aluminum, magnesium and tantalum. The prior art practice with respect to those metallic materials such as described above which are subject to oxidation has been to clean the cathode surfaces to remove any metallic oxide layers.

In a further aspect of the invention, one of the cathode members is formed with an active surface having a protuberant portion which extends axially into the chamber of the ionization section and which is formulated of β⁻ ray emitting material. A second cathode member has an aperture therein along the axis of the protuberant portion to provide for the discharge of ions from the ionization chamber. The active surface of this second cathode member is formulated of a material having a secondary electron emission factor of at least 2. Preferably, a portion of the active surface of the first cathode member, which is recessed with respect to the protuberant portion, is also formulated of a material having a secondary electron emission factor of at least 2. It is further desirable that the protuberant portion of the cathode surface be in a closer proximity to the ionization section anode than the remainder of the active cathode surface. This configuration of the cathode member functions to increase the electrical field at the peripheral edge of the protuberant portion and through the central interior of the ionization section, thus enhancing field emission at the peripheral edge and increasing the probability that the electron emitted from the cathode will travel to the opposing cathode rather than being collected by the anode.

Figure 2:
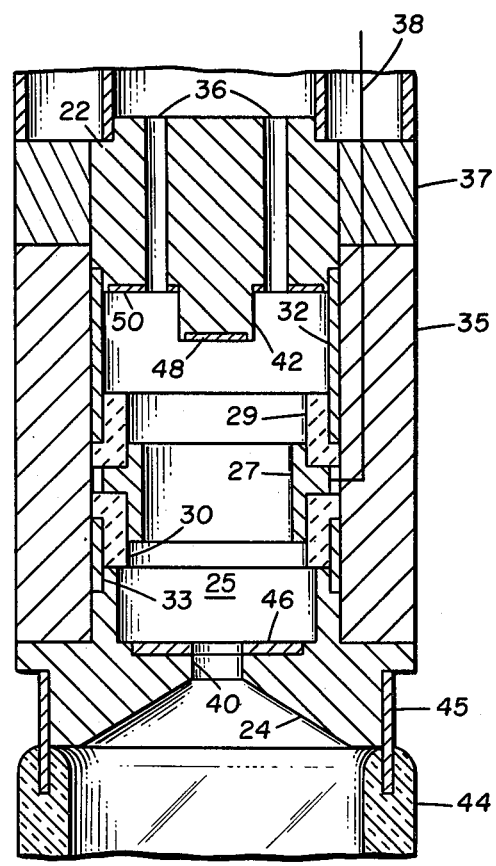
FIG. 2 is a sectional view of the ionization section portion of an accelerator-type neutron tube constructed in accordance with the present invention.

Turning now to FIG. 2 of the drawing, there is illustrated a sectional view of the ionization section 18 of the accelerator-type neutron tube. The ionization section comprises primary and secondary cathode members 22 and 24 which define the upper and lower ends of the chamber 25 in which ionization of the accelerator gas actually takes place. Extending peripherally about the interior of the chamber 25 and located intermediate the cathode members 22 and 24 is an anode member 27. The anode member 27 is mounted on ceramic insulating collars 29 and 30 and thus is insulated from metallic sleeves 32 and 33 which, together with the cathode members, defines the remainder of the ionization chamber. Sleeves 32 and 33 and anode 27 are formed of a nonmagnetic or relatively low permeability metal such as an AISI 300 series austenitic stainless steel. An annular magnet 35 extends around the exterior of the ionization chamber and extends beyond the upper and lower ends of the anode member as shown. Extending from the anode member and between the ceramic collars 29 and 30 and through magnet 35 and an annular ring 37, described in greater detail hereinafter, is an electric lead 38 to a high voltage power supply for the anode.

The cathode member 22 is provided with channels 36 through which accelerator gas from the replenisher section 16 flows into the ionization chamber. The cathode member 24 is provided with an aperture 40 along the same axis as the protuberant portion 42 of cathode member 22 which provides an opening from the ionization chamber into the target section of the neutron tube. The target (not shown) is enclosed within a chamber formed in part by a glass collar 44 which is held in place by a Kovar or other metallic sleeve 45 which is welded to the cathode member 24. The cathode member 24 is provided with an insert 46 which is formulated of beryllium with an oxide layer or another suitable material having a high secondary electron emission factor as described previously. The protuberant portion of cathode member 22 is provided with an insert 48 formed of nickel-63 or another suitable β⁻ ray emitter. The recessed portion of the active cathode surface is provided with an insert 50. In a preferred embodiment of the invention, this insert is formulated of a material having a secondary electron emission factor of 2 or more. In other embodiments of the invention, insert 50 may be formulated of other materials including a β⁻ ray emitting material.

An alternative form of the first cathode member is illustrated in FIG. 3. As shown in FIG. 3, this cathode comprises a main body portion 50 having a central recess which receives a cylindrical member 52 held in place by a screw 54. In this case, the protuberant portion may be removed from the remainder of the cathode structure of application of the β⁻ ray emitting material to the outer end thereof as indicated by reference numeral 55. The cathode structure otherwise may be identical to cathode member 22.

Cathode member 24, cathode member 22, and annular ring 37, are all formed of materials which are relatively permeable to magnetic flux. For example, these elements may be formed of soft iron or AISI series 410 stainless steel. The upper portion of cathode member 24 and the ring 37 together with the lower portion of cathode member 24 and cathode member 22 thus establish a high permeability flux path which extends initially outwardly from the ends of magnet 35 and then turns inwardly to the active surfaces of the cathode members. The high permeability paths established by cathodes 22 and 24 in ring 37 direct most of the magnetic flux between the north and south poles of magnet 35 into the interior of the chamber 25. In addition, it will be recognized from an examination of FIG. 2 that the strongest electric field established upon the application of a positive voltage to anode member 27 will extend from the protuberant portion 42 of cathode member 22. This increases the probability that electrons emitted from cathode member 22 will impact the opposing cathode surface rather than being collected by anode member 27 and together with the spiraling action imparted by the increased magnetic field within the chamber increases the probability that the electrons will impact accelerator gas molecules to produce the desired ions.

I claim:

1. In a neutron accelerator tube having a target and a spaced replenisher section for supplying accelerator gas, an ionization section located between said target and said replenisher section comprising:
   (a) a means forming an ionization chamber in said tube adapted to receive accelerator gas from said replenisher section,
   (b) first and second cathodes spaced from one another and having opposed active surfaces exposed to the interior of said chamber, the active surface of at least one of said cathodes being formulated of a $\beta^-$ ray emitting material, and
   (c) anode means located at a position intermediate of said first and second cathodes whereby in response to an applied positive voltage electrons are transmitted between the opposed active surfaces of said cathodes and produce the emission of secondary electrons upon impacting an active cathode surface.

2. The system of claim 1 wherein said $\beta^-$ ray emitting material is nickel-63.

3. The system of claim 1 wherein the active surfaces of both of said first and second cathodes are formulated of a $\beta^-$ ray emiting material.

4. The system of claim 3 wherein said $\beta^-$ ray emitting material is nickel-63.

5. The system of claim 1 wherein the active survace of said first cathode is formulated of a $\beta^-$ ray emitting material and the active surface of said second cathode is formulated of a material having a secondary electron emission factor of at least 2.

6. The system of claim 5 wherein said $\beta^-$ ray emitting material is nickel-63.

7. The system of claim 6 wherein said material having a secondary electron emission factor of at least 2 is beryllium oxide.

8. In a neutron accelerator tube having a target and a spaced replenisher section for supplying accelerator gas, an ionization section located between said target and said replenisher section comprising:
   (a) means forming an ionization chamber in said tube adapted to receive accelerator gas from said replenisher section,
   (b) a first cathode member located in said tube adjacent to said replenisher section and having an active surface exposed to the interior of said chamber with a protuberant portion extending axially into said chamber, said protuberant portion being formulated of a $\beta^-$ ray emitting material,
   (c) a second cathode member spaced from said first cathode member in the direction of said target having an aperture therein along the axis of said protuberant portion and having an active surface exposed to the interior of said chamber and opposed to the active surface of said first cathode member formulated of a material having a secondary electron emission factor of at least 2, and
   (d) an anode member extending peripherally around the interior of said ionization chamber at a position intermediate said first and second cathode members.

9. The system of claim 8 wherein a portion of the active surface of said first cathode member, which is recessed with respect to said protuberant portion, is formulated of a material having a secondary electron emission factor of at least 2.

* * * * *